N. BLY.
Machine for Reducing Wood to Paper-Pulp.
No. 201,152. Patented March 12, 1878.
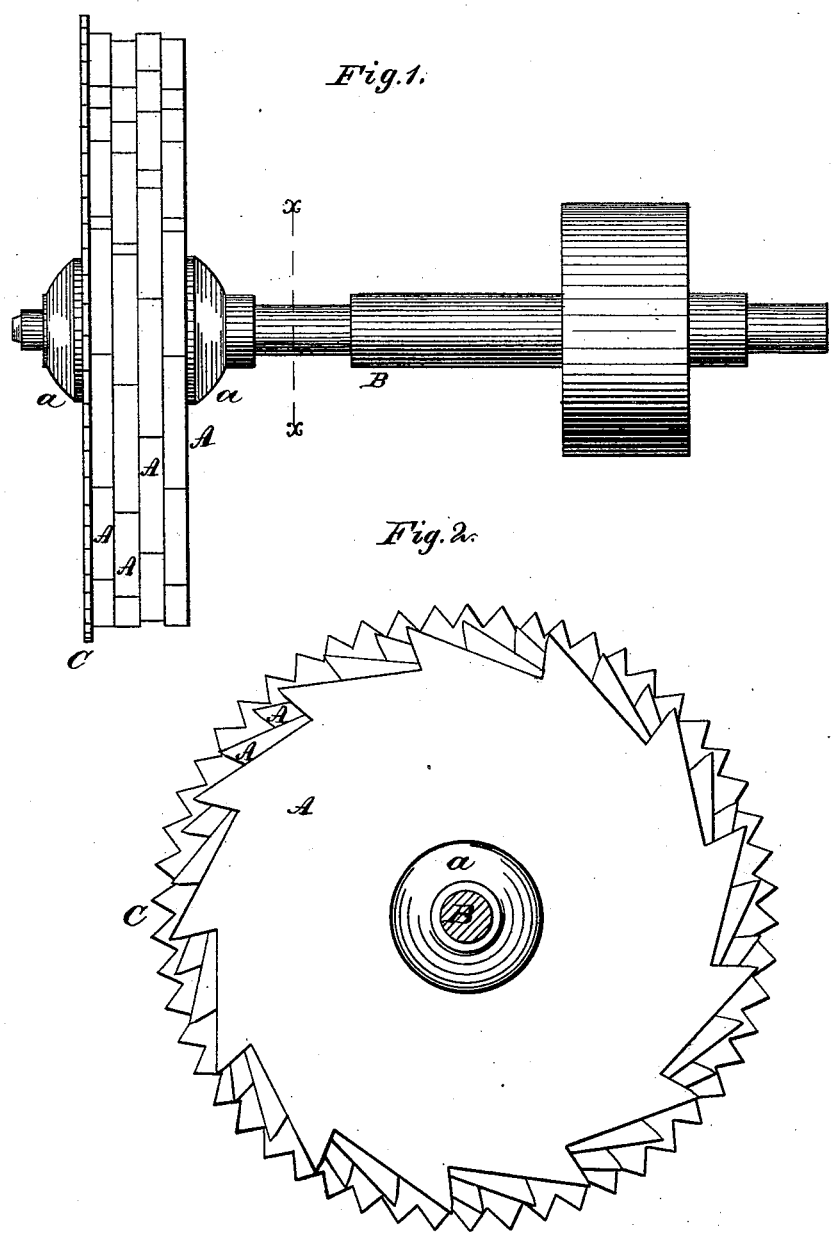

UNITED STATES PATENT OFFICE.

NORMAN BLY, OF CROWN POINT, NEW YORK.

IMPROVEMENT IN MACHINES FOR REDUCING WOOD TO PAPER-PULP.

Specification forming part of Letters Patent No. 201,152, dated March 12, 1878; application filed January 31, 1878.

*To all whom it may concern:*

Be it known that I, NORMAN BLY, of Crown Point, in the county of Essex and State of New York, have invented a new and Improved Wood-Pulp Machine, of which the following is a specification:

Figure 1 is a front elevation. Fig. 2 is a side elevation taken in section on line $x$ $x$ in Fig. 1.

Similar letters of reference indicate corresponding parts.

My invention relates to machines for disintegrating wood for the manufacture of paper-pulp; and it consists in a series of thick circular saws and a single thin saw of slightly larger diameter, mounted on a suitable mandrel or shaft, and driven by a suitable motor.

Referring to the drawing, A A, &c., are thick circular saws of equal diameter, placed on the mandrel B, and C is a thin circular saw, also placed on the mandrel B.

The saws A C are clamped between collars $a$, in the usual way. The thick saws A are provided with coarse teeth, the points of which are sharpened on a radial line, so that they will scrape the wood, and the saws are arranged so that the teeth and spaces between the teeth of adjacent saws alternate in position.

The thin crosscut-saw C is larger in diameter than the saws A, and cuts slightly in advance of the said saws, so as to form a guide for the wooden block as it is forced against the thicker saws.

The mandrel is rotated in any suitable manner, and the wooden block from which the pulp is made is forced against the saws with its grain parallel with the axis of rotation of the saws, so that they cut or scrape the fibers from the block. The fibers are carried by a stream of water through a suitable chute, and delivered to a tank, from which the pulp is pumped and delivered to the refining-mill.

With a rigid support for holding the wooden block, the thin crosscut-saw may be dispensed with.

It is obvious that saws of different forms may be employed for this purpose, and that a cylinder having a number of cutters may be substituted for a series of saws, and also that reciprocating saws may be employed. Therefore, I do not limit or confine myself to the exact form or proportion herein described.

Having thus described my invention, I claim as new and desire to secure by Letters Patent—

The combination of the thick saws A, having radial cutting-edges, and the larger guide-saw C, all clamped on the same mandrel, as and for the purpose specified.

NORMAN BLY.

Witnesses:
   C. SEDGWICK,
   GEO. M. HOPKINS.